Jan. 25, 1955  J. W. HIERONYMUS  2,700,558
LOAD COMPENSATOR FOR SEALING RINGS AND THE LIKE
Filed Sept. 18, 1952

INVENTOR.
John W. Hieronymus.
BY
ATTORNEY.

2,700,558

LOAD COMPENSATOR FOR SEALING RINGS AND THE LIKE

John W. Hieronymus, Three Rivers, Mich., assignor to The Johnson Corporation, Three Rivers, Mich., a corporation of Michigan Application September 18, 1952, Serial No. 310,283

4 Claims. (Cl. 285—10)

This invention relates to improvements in fluid sealed joints of the type employed to conduct steam and other pressure fluid to a required location, such as to a rotary drum of a paper drier, and which joints comprise a pressure chamber to which the pressure fluid is admitted and a pipe which extends from one end of the pressure chamber and serves to conduct the pressure fluid to the required location, there being sealing means provided within the pressure chamber in operative association with the interior walls of the chamber and with the said pipe for sealing the chamber against leakage of the pressure fluid. In particular, the invention relates to fluid sealed joints of the type disclosed in the prior U. S. Patents Nos. 1,929,635; 2,222,612; 2,328,898; 2,352,317; 2,385,421; 2,477,762; 2,497,183 and Reissue Patent No. 23,298.

In connection with the operation of joints of the above type, the joint surfaces are in a state of unbalance with the fluid pressure within the pressure chamber applying a load against the sealing surfaces which increases as the fluid pressure increases, and gives rise to a pressure reaction upon the sealing surfaces. These, however, are required to provide a running seal to permit rotation of the fluid conductor pipe and it becomes necessary, therefore, to control or compensate the pressure load upon such surfaces if the joint is to operate successfully.

It is an object of the present invention, therefore, to provide a fluid pressure rotary joint of the type described in which the internal pressure loading upon the sealing parts is compensated.

Another object of the invention is to provide an unbalanced fluid pressure rotary joint in which the pressure chamber is reacted upon counter to the unbalanced forces upon the running joint seal.

Figure 1:
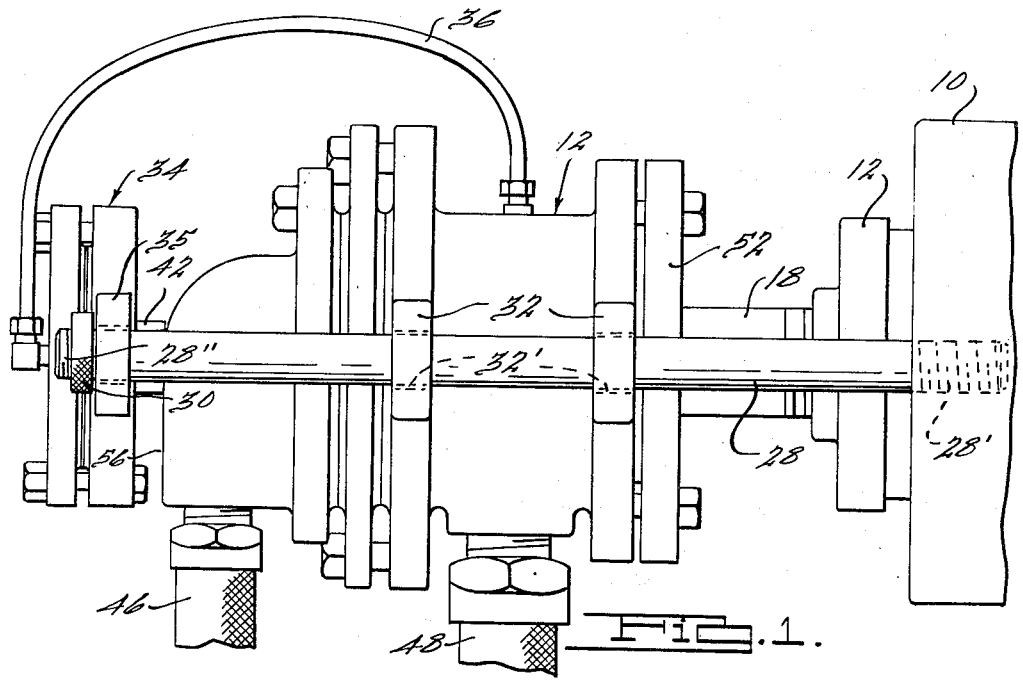
Figure 2:
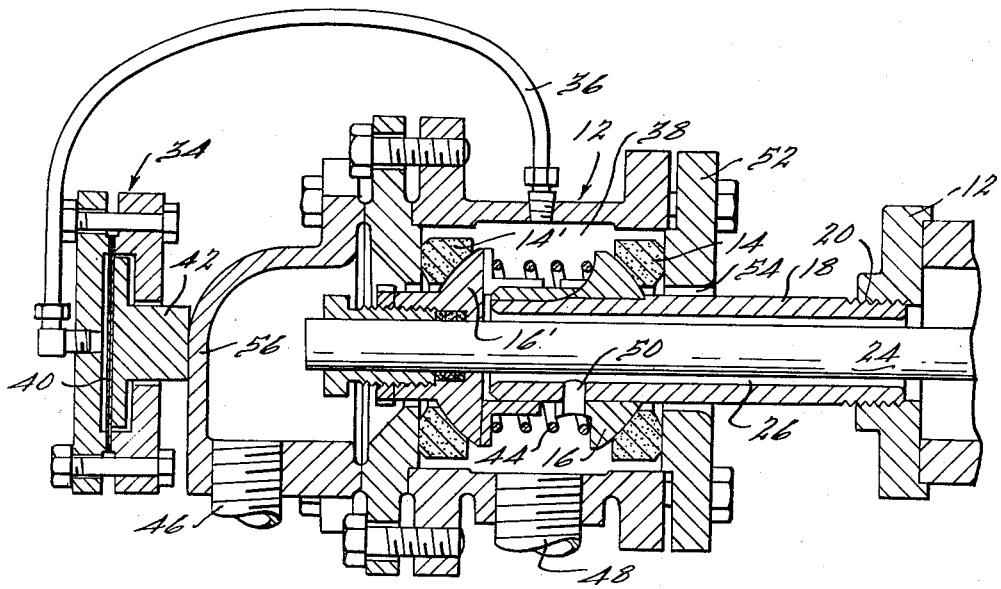

The above and other objects and advantages, residing in the construction, arrangement and combination of parts, will appear clear from a consideration of the following detail description with reference to the accompanying drawings, in which:

Figure 1 is a side elevational view of a joint and compensator assembly in accordance with the invention, and Figure 2 is a longitudinal section of Figure 1.

Referring to the drawings, 10 indicates a fixed structure, such as part of the casing structure of a machine to which the rotary fluid sealed joint and compensator assembly is applied.

The rotary fluid sealed joint and compensator assembly comprises a cylinder assembly, indicated generally at 12, providing a pressure chamber in which a nested pipe assembly is mounted for rotary and swinging motion while being permanently sealed against the escape of the conducted steam or other fluid by the action of sealing rings 14, 14' and cooperating collars 16, 16' on the pipe assembly. The pipe assembly comprises an outer pipe 18 connected, as by the screw-threaded connection 20, with a hollow drum 22 rotatably mounted in the machine casing 10, and an inner concentric rotary pipe 24, defining with the outer pipe 18 an annular fluid flow passage 26.

The cylinder assembly is supported in position upon the casing 10 by means of horizontally extending rods 28. Two such rods would normally be provided upon opposite sides of the cylinder assembly. One such rod is shown in Figure 1, with a screw-threaded inner end 28', by which the rod is screwed into position on the casing 10, and having a screw-threaded outer end 28" on which a hand nut 30 is mounted. This rod is slidably passed through holes 32' in lugs 32 on the cylinder assembly. The cylinder assembly is held by the rods 28 against rotation. The rods are also guided in lugs 35 provided upon a relatively fixed fluid actuator assembly 34 provided at the outer end of the cylinder assembly 12, remote from the casing 10.

The fluid actuator assembly 34 is supported from the cylinder assembly 12 by a pipe 36, which pipe is in communication at one end with the interior 38 of the pressure chamber 12 and, at its opposite end, communicates with one side of a diaphragm 40 mounted within the actuator casing 34 and actuating a plunger 42. This plunger is arranged to have contact with the end of the movable cylinder assembly 12 remote from the sealing ring 14.

The sealing rings 14, 14' and their cooperating collars 16, 16', respectively, have spherical inter-engaging surfaces held in engagement with one another by the action of a coil spring 44. The actual construction and function of the rotary fluid sealed joint thus provided, and shown in Figure 2 in particular, forms no part of the present invention but is disclosed in said prior patents and in particular in the prior Patent No. 2,385,421. It may be noted, however, that the movable cylinder assembly is fitted with pipe connections 46 and 48 which, alternatively, serve as inlet or outlet pipes for the steam or other fluid admitted into and discharged from the rotary joint cylinder 12 and that communication with the annular chamber 26 is possible through a radial passage 50 in the outer pipe 18.

52 indicates the end wall of the cylinder assembly 12 through which the pipe assembly 18, 24 passes with all-round clearance with respect to the opening 54 and with respect to the inside surface of which wall 52 the sealing ring 14 is required to maintain sealing engagement at all times. The sealing ring and collar assembly 14, 14' and 16, 16' together with the pipe assembly 18, 24 form, in effect, a relatively fixed piston assembly operating in the cylinder assembly 12, it being appreciated that the pipe assembly is connected with the relatively fixed machine casing 10. The collars 16 and 16' are required to have a running seal with respect to the sealing rings 14 and 14' and the surface areas presented to the pressure fluid within the pressure chamber are unequal, as will be appreciated.

In the operation of the joint the running seal provided by the engaging sealing parts 14, 14' and 16, 16' is subjected to the unbalanced forces of the pressure fluid developed within the pressure chamber 12 and these forces are reacted against by the force applied to the pressure chamber by the piston 42, which piston has a reaction upon the joint counter to the unbalancing forces upon the running seal to reduce the same.

The present invention, therefore, compensates the internal unbalanced pressure reaction effect by providing the load applying actuator plunger 42 at the end of the cylinder assembly 12 (pressure chamber) remote from and opposite the end wall 52. This plunger 42 acts counterwise to the internal load reaction upon the sealing ring 14 and enables this ring to maintain the required sealing action throughout the entire pressure operating range, while permitting the pipe assembly 18, 20 to rotate with respect to the pressure chamber.

In the particular example shown in the drawings, the counter and compensating load is applied to the actuator plunger 42 through the pressure in the cylinder assembly 12 being conveyed by the pipe 36 to act against the diaphragm 40. The applied counterbalancing load is therefore proportional to the fluid pressure within the pressure chamber.

Having thus described my invention with reference to one specific form thereof, but without limitation thereto, what I claim as novel and wish to secure by Letters Patent is as follows:

1. In a rotary pressure joint in which a casing defining a pressure chamber has opposite end walls through which a pipe for conducting pressure fluid extends and has separate running seals at said end walls, which seals are subjected to unbalanced pressure when pressure fluid is admitted to said chamber, whereby the sealing action tends to be reduced at one of said end walls, said seals including elements having surfaces of which the area presented to the pressure fluid at one end of said chamber is greater than the area presented to said fluid at the opposite end of said chamber, the provision of means for reacting against said unbalanced pressure in counterwise relation to the reduction of the seal at the end wall with the said surface of greater area, said means comprising force applying means, and means mounting said force applying means in operative position with respect to said one end wall for applying a force to said end wall counter to the fluid pressure thereagainst.

2. The invention as defined in claim 1, including means for actuating said force applying means proportionally to the pressure in said pressure chamber.

3. In a rotary pressure joint in which a casing defining a pressure chamber has opposite end walls through which a pipe for conducting pressure fluid extends and has running seals at said end walls, which seals are subjected to unbalanced pressure when pressure fluid is admitted to said chamber, whereby the sealing action tends to be reduced at one of said end walls, the provision of means for reacting against said unbalanced pressure in counterwise relation to the reduction of the seal at said one end wall, said means comprising a plunger, means supporting said plunger for movement against said casing for applying said counterforce, and means connecting said plunger for movement in dependence upon, and proportional to, the pressure in said chamber.

4. In a rotary pressure joint in which a casing defining a pressure chamber has opposite end walls through which a pipe for conducting pressure fluid extends and has running seals at said end walls, which seals are subjected to unbalance pressure when pressure fluid is admitted to said chamber, whereby the sealing action tends to be reduced at one of said end walls, the provision of means for reacting against said unbalanced pressure in counterwise relation to the reduction of the seal at said one end wall, said means comprising a plunger, means supporting said plunger for movement against said casing for applying said counterforce, and conduit means interconnecting said plunger with said pressure chamber for supplying pressure fluid from said chamber to actuate said plunger.

References Cited in the file of this patent

UNITED STATES PATENTS

| 943,904 | Struer | Dec. 21, 1909 |
| 1,769,905 | Berry | July 1, 1930 |